INVENTORS:
FRITS M. DAUTZENBERG
HERMAN W. KOUWENHOVEN
JAAP E. NABER

THEIR ATTORNEY

3,770,647
SHAPED ACCEPTORS FOR BINDING AND REMOVING SULFUR OXIDES FROM FLUE GASES AND PROCESS FOR THEIR MANUFACTURE
Fritz M. Dautzenberg, Herman W. Kouwenhoven, and Jaap E. Naber, Amsterdam, Netherlands, assignors to Shell Oil Company, New York, N.Y.
Filed July 27, 1970, Ser. No. 58,461
Claims priority, application Netherlands, July 29, 1969, 6911550
Int. Cl. B28b 1/50; C09k 3/00
U.S. Cl. 252—190                                11 Claims

ABSTRACT OF THE DISCLOSURE

A process is disclosed for the manufacture of shaped articles which are suitable to be used as solid acceptors in gas cleaning processes by mixing a dehydrated refractory oxide with a ceramic binder, forming the mixture into a shaped article, heating the shaped article to a temperature to form a ceramic article, impregnating with a metal compound, and then calcining the formed, impregnated article.

BACKGROUND OF THE INVENTION

Acceptors may effectively be used for the purification of gas mixtures which contain one or more components which, if they were discharged into the atmosphere, would give rise to atmospheric pollution. Examples of such components which are generally regarded as harmful contaminants are sulfur dioxide, sulfur trioxide, oxides of nitrogen and residues of combustible substances in exhaust gases of internal combustion engines. One or more of these components occur, for instance, in flue gases and in waste gases of sulfuric acid plants, roasting furnaces for ores and nitric acid plants.

The term acceptor in the present description and claims means a solid substance which is capable of binding one or more particular materials in a gas, such as gaseous compounds or elements. The gas may be bound by the acceptor physically or chemically.

Sulfur oxides may be removed from flue gas by contacting the flue gas containing one or more sulfur oxides and oxygen with an acceptor comprising a metal and/or a metal compound supported on a carrier material. Processes of this type may be carried out at flue gas temperatures, i.e, at about 200–500° C. The sulfur oxide is bound by the acceptor resulting in a purified gas that does not pollute the atmosphere. Moreover, the purified gas may be discharged via a stack without being first cooled and then reheated to make it buoyant. The loaded acceptor contains metal sulfide which may subsequently be decomposed with the aid of a reducing gas. As a result of this "regeneration" the acceptor is again capable of binding sulfur oxides and, moreover, a gas is formed which is considerably richer in sulfur dioxide than the non-purified flue gas, and this sulfur dioxide-rich gas may be used, for instance, for the preparation of sulfuric acid or elemental sulfur.

By a known process for the manufacture of shaped catalyst material, aluminum hydroxide is mixed with a clay, the mixture thus formed is shaped to articles, the articles are dried below 100° C., the dried articles are baked at a temperature between 900 and 1400° C. and catalytically active metal is applied to the baked articles. It has been found, however, that if a shaped acceptor is manufactured by this known process, this acceptor cracks and scales after a relatively short period of use.

THE INVENTION

A process has now been found for the manufacture of shaped catalysts or acceptors which do not disintegrate during use.

The invention includes preparing a mixture containing a previously dehydrated refractory oxide carrier material and a ceramic binder, shaping the mixture into an article, heating the shaped article to a temperature at which it is baked to a ceramic article, applying a metal or metal compound to the ceramic article and then calcining the ceramic article.

The ceramic articles manufactured by the process according to the invention do not disintegrate after relatively long periods of use. Moreover, the ceramic articles, once they have been baked, do not crack during use.

The refractory oxide carrier material should be dehydrated before use, i.e., the carrier material should be heated to a temperature above which there is virtually no shrinkage. Failure to first dehydrate the refractory oxide will result in decomposition of the ceramic articles during use. This resistance to deterioration is very surprising because the acceptors are used at high temperatures, and they also take part in chemical reactions at high temperatures, both during the acceptance step and during the regeneration step. Moreover, the acceptance and regeneration steps alternate at relatively short intervals, for instance, every half hour.

The mixture containing carrier material and binder may be shaped into any suitable form, for instance, into extrudates, pellets, tablets, granules, plates, and sheets. Methods suitable for shaping the mixture, such as casting, rolling in drums, extruding and pressing, are conventional and generally known.

The mixture is preferably shaped into sheets. Since sheets prepared in accordance with this invention do not disintegrate during use, it is not necessary for them to be used in containers. It is sufficient to support the sheets only at their ends, and possibly in their middle, and otherwise to leave them free. A number of sheets may be combined into larger units, and these larger units may be arranged parallel to each other and spaced some distance apart. The gas to be treated can pass between these larger units, i.e., along the sheets.

Any suitable dimensions may be chosen for the sheets. Since most gas cleaning processes are diffusion limited, it is preferred to keep the sheets as thin as possible, preferably between 0.1 and 2 cm. The length and width of a sheet of such thickness are preferably not greater than 30 cm.

The invention also relates to an apparatus for contacting a gas mixture with articles manufactured by the process according to the invention. The apparatus includes a system of substantially parallel sheets inside a housing which is provided with a gas inlet and a gas outlet, and with the sheets mounted in the housing to form gas channels that are bounded by at least one sheet surface.

Since the acceptor of this invention does not have to be placed in acceptor containers, the apparatus according to the invention is considerably less expensive than an apparatus in which the acceptor is in a container.

The invention is illustrated by means of the accompanying schematic drawing which, for simplicity, omits showing conventional auxiliary equipment such as controls, connectors, valves, etc.

Figure 1:
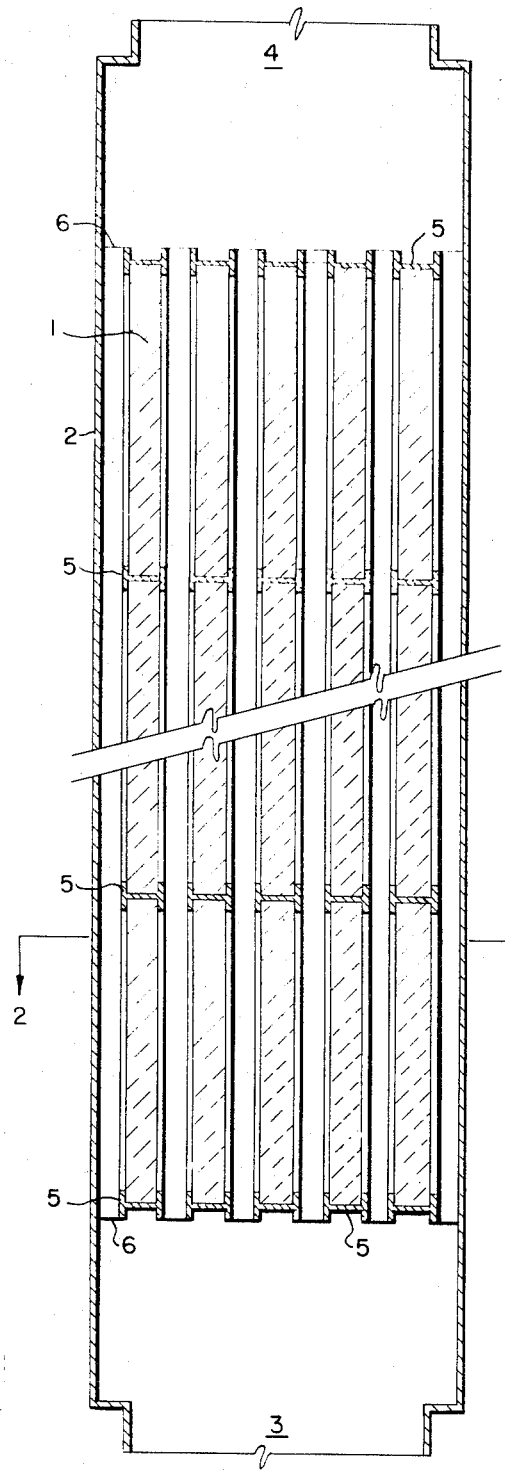
FIG. 1 is a sectional view of an apparatus embodying this invention taken parallel to the direction of flow of a gas mixture to be passed therethrough and perpendicular to the main plane of the acceptor sheets.

FIG. 1 shows five parallel acceptor sheets 1. The acceptor sheets 1 may be suitable, for instance, for accepting sulfur oxides from flue gases. The system of acceptor sheets 1 is mounted in a housing 2, which is provided with a gas inlet 3 and a gas outlet 4. In the case shown four gas channels are bounded by the acceptor sheets 1 and two gas channels by the outer two acceptor sheets 1 and the wall of the housing 2. In the case shown each sheet 1 is kept in position in two places by supporting elements 5 and spacers 6.

Figure 2:
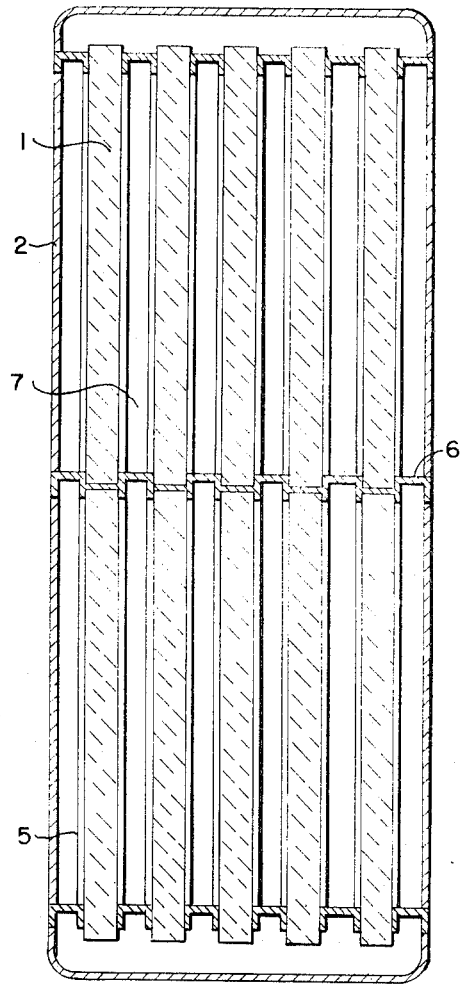
FIG. 2 is a sectional view of the apparatus shown in FIG. 1 taken along the line 2—2.

In FIG. 2 the same numerals used in FIG. 1 refer to the same parts. In the case shown the numeral 7 refers to the separation between two acceptor sheets 1 which are placed in a line with each other. Thus, the figures illustrate an apparatus having an indeterminate number of vertical rows of acceptor sheets that are horizontally two abreast.

In effecting the process of this invention the carrier material and the ceramic binder may be mixed by any method usually followed in the art, for instance, by mixing the appropriate materials in a finely divided state either dry or in the presence of water. Good results are obtained if the ceramic material is ground to colloidal size and mixed with finely divided carrier material. The very small dimensions of the colloidal particles permit them to penetrate readily between the particles of the refractory oxide carrier material and to bind them together satisfactorily during baking.

When the particles are mixed as a suspension, they must be dried before the formation of baked articles. Drying may be effected conventionally, for instance, by spray-drying or by filtering, followed by drying of the cake left on the filter.

After the articles have been formed, they are heated to a temperature at which the conversion into ceramic articles takes place to produce mechanically strong articles. Articles which have been heated to a temperature which is not high enough for the conversion into ceramic articles are considerably less strong and quickly disintegrate during use.

Suitable carrier materials include any dehydrated refractory oxide which can be impregnated with a metal or metal compound. Examples of such carrier materials are bauxite, synthetic alumina, silica, silica-alumina, silica-magnesia, beryllium oxide, thorium dioxide and zirconium dioxide, to name a few. Aluminum oxide, more particularly active (or activated) alumina, has been found to be particularly satisfactory and is the preferred refractory oxide.

Examples of suitable ceramic binders are mineral clay types, such as kaolin, attapulgite, halloysite, montmorillonite and sepiolite. Kaolin is preferred because it is easily purified and reduced to the desired particle size.

The dehydrated refractory oxide carrier material to be used may, in principle, be prepared by any suitable method. The preparation may be started from a commercially available hydrated aluminum oxide, which is sintered at a temperature between 800 and 1100° C. where it loses water of hydration to become one of the varieties of activated aluminum oxide.

The proportion of binder to carrier required to obtain a strong ceramic article depends upon which binder and carrier material are used and may easily be determined for each individual case. With kaolin binder and aluminum oxide it is preferred to use 0.04 to 1 and usually 0.10 to 0.50 part of clay per part of aluminum oxide on a weight basis.

The temperature at which the shaped articles are heated for the formation of the ceramic article also depends on the specific binder and carrier material used. With kaolin and aluminum oxide a temperature between 800 and 1100° C. is preferably used. A convenient method for manufacturing the shaped articles is to start treating them at a temperature of at least 100° C. and then gradually further heating them until the baking process sets in. In this way both drying and baking are adequately accomplished.

The articles manufactured by the process according to the invention are porous. Porosity is desirable and it may be considerably increased if the mixture containing the dehydrated refractory oxide carrier material and the ceramic binder also contains a pore-forming agent. Suitable pore-forming agents for this purpose include combustible substances such as flour, wood, synthetic or natural resins, waxes, paraffin, sulfur, sugar, or soluble substances such as water-soluble salts, gas-forming substances such as persalts and peroxides, or polymers such as polypropene. A preferred pore-forming agent is a substance which, upon being heated, changes into a gas to avoid the necessity of later removing the pore forming substance from the finished articles. Polypivalolactone has been found very suitable for this purpose because it decomposes into butene and carbon monoxide. The pore-forming agents may be used, for instance, in an amount of from 1 to 25% w. of the mixture.

The metal or metal compound may be applied to the ceramic article thus manufactured by any suitable method. It is preferred to use known impregnation techniques because they are very simple. One method of impregnation is effected by immersion of the ceramic article in an aqueous solution of a metal salt, subsequently draining the impregnated article and drying it at a temperature of, for instance, 450 to 650° C.

The metal or metal compound is applied after the article is baked because the acceptor thus prepared takes up considerably larger amounts of impurities such as sulfur oxides than an acceptor prepared by applying the metal to the refractory oxide before baking.

The process according to the invention is particularly suitable for the manufacture of acceptors for sulfur oxides from waste gases using copper or a copper compound. Copper oxide is capable of accepting sulfur oxides from flue gases at flue gas temperatures, i.e., 200–500° C., and the compound formed during said acceptance can be regenerated with the aid of a reducing gas also at flue gas temperatures. It is therefore not necessary to raise or lower the temperature of a copper-containing acceptor between an acceptance step and a regeneration step.

The following examples are presented to further illustrate the invention.

EXAMPLE I

In this example a description is given of the manufacture of tile-shaped acceptors. Five types of acceptor tiles were prepared, of which the types A, B and C were according to the invention, and the types D and E were not.

(A) Preparation of tiles of type A

An 80 gram quantity of $\gamma$-alumina manufactured by spray-drying and having a water content of 23% w. and an average particle size of 70$\mu$ was placed in an oven where the temperature was gradually raised from room temperature to 850° C. through a period of 200 minutes. The alumina was sintered by keeping the oven temperature at 850° C. for 3 hours. The sintered alumina was cooled to room temperature outside the oven, and subsequently moistened with 250 ml. water. To the moistened alumina 22 grams of kaolin was added, with stirring. The kaolin was colloidally distributed in 22 grams of water and had a particle size smaller than 2$\mu$. The suspension thus formed was filtered, and the filter cake was dried at 100° C. The dried mixture contained 71.1% w. water, calculated on solids.

This mixture was mixed with 10% w. (calculated on solids) of polypivalolactone added as a pore-forming agent. The mixture thus formed was pressed to cylindrical tiles having a diameter of 55 mm. and a thickness of 3.5 mm. Subsequently, the tiles were heated at a uniform rate from room temperature to 850° C. in an oven through a period of 200 minutes and then converted into ceramic articles by keeping them at 850° C. for 2 hours. Next, the temperature of the oven was gradually lowered to room temperature through a period of 4 hours. The cooled tiles were immersed in an aqueous copper nitrate solution for 30 minutes, after which the tiles were drained, and dried at 100° C. The dried tiles were heated to 500° C. in an oven through a period of 2 hours, and kept at 500° C. for 3 hours. Subsequently, the oven temperature was gradually lowered to room temperature through a period of 3 hours. The copper content of the solution was such that the tiles contained 9% copper calculated on the total weight basis.

(B) Preparation of tiles of type B

The tiles of type B were manufactured in the same manner as those of type A, except that the pore-forming agent was powdered cellulose, and before immersion in the copper nitrate solution, the tiles were ground. The copper content of the tiles was 9%, calculated on the total weight.

(C) Preparation of tiles of type C

The tiles of type C were manufactured in the same manner as those of type A, except that no pore-forming agent was used. The copper content of the tiles was 9%.

(D) Preparation of tiles of type D

The tiles of type D were manufactured in the same manner as those of type A, except that the γ-alumina was not sintered, so that it was mixed with the kaolin in the hydrated form.

(E) Preparation of tiles of type E

The tiles of type E were manufactured in the same manner as those of type A, except that the polypivalolactone-containing tiles were heated to 500° C. instead of 850° C.

(F) Testing of the tiles of types A, B, C, D and E

Each of the four types of tiles A, B, C and D were subjected to 500 acceptance-regeneration cycles in which the tiles were placed vertical and the gases passed along the tiles.

Each of these cycles comprised the following steps:

(1) Acceptance of sulfur dioxide, which was carried out by passing a gas containing 75% v. air, 10% v. water and 15% v. sulfur dioxide along the plates for 2.5 minutes at a temperature of 400° C. and at a space velocity of 5000 Nl. gas/liter acceptor sheet/hour;

(2) Flushing of the gas channels by passing nitrogen through them for 5 minutes at a space velocity of 6000 Nl. gas/liter acceptor sheet/hour;

(3) Regeneration of the load acceptor by passing a mixture of 90% v. propane and 10% v. propane along the tiles for 2.5 minutes at a temperature of 400° C. and at a space velocity of 1000 Nl. gas/liter acceptor sheet/ hour;

(4) Burning off carbon-like deposits on the acceptor by passing hot air along the tiles for 3 minutes at an initial temperature of 400° C. and at a space velocity of 4000 Nl./liter acceptor sheet/hour.

At the end of the 500 cycles the appearance of the four types of tiles was as follows. The tiles of the types A, B and C had the same appearance as they had at the beginning of the test. They exhibited no cracks and had not scaled. The tiles of type D showed a number of shrinkage cracks and had partially scaled. These tiles distintegrated when touched with the hand. The tiles of type E were not tested because they could be pulverized so easily that they could not be installed.

EXAMPLE II

Four types of acceptors were prepared differently starting from 1/32-inch extrudates of activated aluminum oxide.

Type 1 was prepared by pre-calcining the extrudates for 3 hours at 500° C., impregnating the calcined extrudates with enough aqueous copper nitrate solution to produce a copper content in the impregnated extrudates of 9% w. (calculated as copper), and calcining the impregnated extrudates for 3 hours at 500° C.

Type 2 was prepared in the same manner as type 1, except that the pre-calcination was carried out at 850° C. instead of at 500° C.

Type 3 was prepared in the same manner as type 1, except that the copper-containing extrudates calcined at 500° C. were calcined again for 3 hours at 850° C.

Type 4 was prepared in the same manner as type 2, except that the copper-containing extrudates calcined at 500° C. were calcined again for 3 hours at 850° C.

With each of the extrudates of types 1 and 2 four tests, and with each of those of types 3 and 4 two tests were carried out. In each test a cylindrical tube with an inside diameter of 1.0 cm. was filled with extrudates to a height of 10 cm., after which a gas containing 13.5% v. $CO_2$, 6.1% v. $O_2$, 74.5% v. $N_2$, 5.5% v. $H_2O$ and 0.3% v. $SO_2$ was passed through the tube at the space velocity indicated in the table below. Each test was terminated when the total amount of sulfur dioxide that had left the tube was 10% of the total amount of sulfur dioxide introduced. After termination of each test the number of moles $SO_2$ taken up by the acceptor per gram atom of copper was calculated.

The results of the tests are given in the table.

TABLE

| Space velocity, N l gas/l acceptor/ hour | Acceptor type | | | |
|---|---|---|---|---|
| | 1 | 2 | 3 | 4 |
| | Preparation | | | |
| | Calcination at 500° C., impregnation with copper nitrate solution and calcination at 500° C. | Calcination at 850° C., impregnation with copper nitrate solution and calcination at 500° C. | As with type 1, followed by 2d calcination at 850° C. | As with type 2, followed by 2d calcination at 850° C. |
| | Degree of loading with $SO_2$, moles $SO_2$/gram atom copper | | | |
| 8,000 | 72 | 65 | 22 | 15 |
| 4,000 | 89 | 80 | 30 | 20 |
| 2,500 | 99 | 85 | | |
| 2,000 | 100 | 85 | | |

The above results show that at the same space velocity of the sulfur dioxide containing gas the acceptors which had been calcined at 850° C. after impregnation with the copper nitrate solution could be loaded with a considerably smaller amount of $SO_2$ than the acceptors which had been calcined at 500° C. for following impregnation. These results indicate that the copper or copper compound should be applied to the article after the article has been baked to a ceramic article rather than before baking and that calcining of the impregnated, baked article should always be at a temperature lower than the baking temperature. Catalyst 1 in the table which was not baked at high temperature, deteriorated during use.

Other materials may be included in the mixture before baking without departing from the scope of the invention. It is particularly advantageous to include an inorganic fibrous reinforcing material to provide structural strength to the finished article. Suitable fibrous materials include fiber glass, asbestos, fibrous forms of alumina, certain naturally fibrous clays, to mention a few.

We claim as our invention:

1. A shaped porous ceramic article suitable for use as an acceptor for binding and removing sulfur oxides from flue gases produced by preparing a mixture comprising 1 part by weight of activated aluminum oxide and 0.04 to 1 part by weight of a kaolin, shaping said mixture into an article, heating said article to a temperature between 800 and 1100° C. whereby it is baked into a ceramic article, impregnating said ceramic article with an aqueous solution of a copper salt and calcining said impregnated ceramic article at a temperature between 450° C. and 650° C.

2. A process for the manufacture of a porous shaped ceramic article which is suitable for use as an acceptor for binding and removing sulfur oxides from flue gases which comprises: (a) preparing a mixture comprising 1 part by weight of activated aluminum oxide and 0.04 to 1 part by weight of a mineral clay ceramic binder, (b) shaping said mixture into an article (c) heating said shaped article to a temperature between 800 and 1100° C. whereby it is baked into a ceramic article, (d) impregnating said ceramic article by immersing it in an aqueous solution of a copper salt, and (3) calcining said impregnated ceramic article at a temperature between 450° C. and 650° C.

3. The process of claim 6 in which said mixture is shaped into sheets.

4. The process of claim 3 in which said mixture is formed into sheets having a maximum length and width of 30 cm. and a thickness between 0.1 and 2 cm.

5. The process of claim 2 in which the aluminum oxide is prepared by sintering a hydrated aluminum oxide at a temperature between 800 and 1100° C.

6. The process of claim 2 in which the ceramic binder is kaolin.

7. The process of claim 2 wherein said mixture contains from 1 to 25% by weight of the mixture of a pore forming agent.

8. The process of claim 7 wherein the pore-forming agent is a substance which, upon being heated, changes into a gas.

9. The process of claim 7 in which the pore-forming agent is polypivalolactone or polypropene.

10. The process of claim 2 wherein said mixture include fibrous inorganic material.

11. The process of claim 10 wheren said fibrous material is fiberglass.

References Cited

UNITED STATES PATENTS

| | | | |
|---|---|---|---|
| 2,824,047 | 2/1958 | Gorin et al. | 252—189 X |
| 3,235,512 | 2/1966 | Koepernik | 252—477 R X |
| 3,429,656 | 2/1969 | Taylor et al. | 252—192 X |
| 3,443,886 | 5/1969 | Taylor et al. | 252—192 X |
| 3,288,615 | 11/1966 | Estes et al. | 264—44 X |
| 3,467,602 | 9/1969 | Koester | 264—44 UX |
| 3,501,897 | 3/1970 | Van Helden et al. | 55—74 X |
| 3,686,006 | 8/1972 | Horton | 264—44 MX |
| Re. 24,954 | 3/1961 | Church | 55—523 X |
| 2,733,161 | 1/1956 | Lytton et al. | 117—123 B X |
| 2,902,739 | 9/1959 | Foster | 117—123 B |
| 3,075,494 | 1/1963 | Toulmin | 117—98 X |
| 3,176,054 | 3/1965 | Einstein et al. | 264—44 |

FOREIGN PATENTS

| | | | |
|---|---|---|---|
| 573,142 | 11/1945 | Great Britain | 117—123 B |
| 594,752 | 11/1947 | Great Britain | 117—123 B |
| 855,625 | 12/1960 | Great Britain | 117—123 B |

PHILIP E. ANDERSON, Primary Examiner

U.S. Cl. X.R.

23—284; 55—73; 252—455 R; 264—44